United States Patent
Nuber et al.

(10) Patent No.: US 10,065,631 B2
(45) Date of Patent: Sep. 4, 2018

(54) METHOD FOR ONLINE ADAPTATION OF A CHARACTERISTIC OF A HYBRID VEHICLE

(71) Applicant: MAN TRUCK & BUS AG, München (DE)

(72) Inventors: Johannes Nuber, Karlsfeld (DE); Elmar Kirchensteiner, Vierkirchen (DE); Manuel Günnewicht, Pliening (DE); Matthias Hierlmeier, München (DE); Sebastian Ovari, Hebertshausen (DE)

(73) Assignee: MAN Truck & Bus AG, Munich (DE)

( * ) Notice: Subject to any disclaimer, the term of this patent is extended or adjusted under 35 U.S.C. 154(b) by 0 days.

(21) Appl. No.: 15/185,909

(22) Filed: Jun. 17, 2016

(65) Prior Publication Data
US 2016/0368481 A1 Dec. 22, 2016

(30) Foreign Application Priority Data
Jun. 20, 2015 (DE) .......................... 10 2015 007 913

(51) Int. Cl.
*B60L 9/00* (2006.01)
*B60L 11/00* (2006.01)
(Continued)

(52) U.S. Cl.
CPC .......... *B60W 20/14* (2016.01); *B60L 11/1859* (2013.01); *B60L 11/1862* (2013.01);
(Continued)

(58) Field of Classification Search
USPC .......................................................... 701/22
See application file for complete search history.

(56) References Cited

U.S. PATENT DOCUMENTS 5,359,308 A * 10/1994 Sun .......................... B60K 6/28
180/65.25
5,589,757 A * 12/1996 Klang ................... H01M 10/44
320/160

(Continued)

FOREIGN PATENT DOCUMENTS

DE 102007020196 10/2008
DE 102010005837 7/2011

(Continued)

OTHER PUBLICATIONS

English translation of DE102007020196 A1 to Hoffman (from http://www.google.tl/patents/DE102007020196A1?cl=en).*

(Continued)

*Primary Examiner* — Jean Paul Cass
(74) *Attorney, Agent, or Firm* — Cozen O'Connor (57) ABSTRACT

A method for the online adaptation of a characteristic of a hybrid vehicle having a hybridized drive train with an electric drive that can be supplied with electricity from an electrical energy storage arrangement. The characteristic is used for the selection of an operating mode and/or for determining an operating point of the drive train. The characteristic is adapted by establishing partition boundaries that divide a range of states of charge into a plurality of regions, at least one of the partition boundaries can be variably determined during the operation of the vehicle; predetermining a profile of the characteristic depending on a state of charge of the energy storage arrangement, and online adaptation of the characteristic in the event of a shift of at least one of the variable partition boundaries.

13 Claims, 4 Drawing Sheets

(51) Int. Cl.
G05D 1/00 (2006.01)
G05D 3/00 (2006.01)
G06F 7/00 (2006.01)
G06F 17/00 (2006.01)
B60W 20/14 (2016.01)
B60W 50/00 (2006.01)
B60L 11/18 (2006.01)
B60W 10/06 (2006.01)
B60W 10/08 (2006.01)
B60W 10/26 (2006.01)
B60W 20/12 (2016.01)
B60W 10/18 (2012.01)
B60W 30/188 (2012.01)
B60L 15/20 (2006.01)

(52) U.S. Cl.
CPC ......... *B60L 15/2009* (2013.01); *B60W 10/06* (2013.01); *B60W 10/08* (2013.01); *B60W 10/18* (2013.01); *B60W 10/26* (2013.01); *B60W 20/12* (2016.01); *B60W 30/188* (2013.01); *B60W 50/0097* (2013.01); *B60L 2260/54* (2013.01); *B60W 2050/0088* (2013.01); *B60W 2510/248* (2013.01); *B60W 2550/143* (2013.01); *B60W 2560/02* (2013.01); *B60W 2710/0627* (2013.01); *B60W 2710/086* (2013.01); *B60W 2710/244* (2013.01); *B60Y 2200/92* (2013.01); *B60Y 2300/188* (2013.01); *B60Y 2300/52* (2013.01); *Y02T 10/6291* (2013.01); *Y02T 10/645* (2013.01); *Y02T 10/7005* (2013.01); *Y02T 10/705* (2013.01); *Y02T 10/7044* (2013.01); *Y02T 10/72* (2013.01); *Y02T 10/7275* (2013.01); *Y10S 903/93* (2013.01)

(56) References Cited

U.S. PATENT DOCUMENTS

| | | | |
|---|---|---|---|
| 8,565,947 B2 | 10/2013 | Hoffmann | |
| 8,670,888 B1* | 3/2014 | Brenner | B60L 11/126 180/65.1 |
| 8,727,049 B1 | 5/2014 | Rosen | |
| 9,121,721 B2 | 9/2015 | Lange et al. | |
| 9,517,705 B1* | 12/2016 | Liu | B60L 15/2045 |
| 2001/0039230 A1* | 11/2001 | Severinsky | B60H 1/004 477/3 |
| 2003/0173934 A1* | 9/2003 | Arimitsu | B60K 6/365 322/34 |
| 2004/0060751 A1* | 4/2004 | Frank | B60K 6/48 180/65.21 |
| 2005/0029024 A1* | 2/2005 | Takami | B60K 6/365 180/65.235 |
| 2008/0004156 A1* | 1/2008 | Tabata | B60K 6/365 477/3 |
| 2008/0029318 A1* | 2/2008 | Proietty | B60K 6/48 180/65.265 |
| 2008/0284378 A1* | 11/2008 | Birke | H01M 10/44 320/149 |
| 2009/0017983 A1* | 1/2009 | Iwase | B60K 6/365 477/3 |
| 2009/0023548 A1* | 1/2009 | Imamura | B60K 6/365 477/3 |
| 2009/0044996 A1* | 2/2009 | Frank | B60K 6/48 180/65.29 |
| 2009/0227417 A1* | 9/2009 | Imamura | B60K 6/365 477/5 |
| 2009/0250277 A1 | 10/2009 | Grand et al. | |
| 2010/0217465 A1 | 8/2010 | Hoffmann | |
| 2010/0250497 A1* | 9/2010 | Redlich | F41H 13/00 707/661 |
| 2011/0066308 A1 | 3/2011 | Yang et al. | |
| 2011/0248663 A1* | 10/2011 | Yamakawa | B60L 11/08 318/805 |
| 2012/0010769 A1* | 1/2012 | Sourioux | B60K 6/48 701/22 |
| 2012/0108391 A1* | 5/2012 | Nagashima | B60K 6/48 477/176 |
| 2012/0179329 A1* | 7/2012 | Okamoto | B60H 1/00735 701/36 |
| 2012/0316719 A1 | 12/2012 | Hirsch et al. | |
| 2013/0218387 A1* | 8/2013 | Otsubo | B60K 6/445 701/22 |
| 2013/0282221 A1* | 10/2013 | Harada | B60K 6/445 701/22 |
| 2014/0094159 A1* | 4/2014 | Raleigh | H04W 24/02 455/418 |
| 2014/0102079 A1* | 4/2014 | Linzen | F01N 3/0885 60/274 |
| 2014/0148987 A1* | 5/2014 | Otsubo | B60K 6/445 701/22 |
| 2014/0156185 A1 | 6/2014 | Lange et al. | |
| 2014/0232304 A1* | 8/2014 | Sekiya | H02P 3/18 318/400.02 |
| 2015/0166073 A1* | 6/2015 | D'Amato | B60W 40/076 701/1 |
| 2015/0318811 A1* | 11/2015 | Ota | H02P 23/08 318/139 |
| 2015/0353073 A1* | 12/2015 | Kinoshita | B60K 6/445 701/22 |
| 2015/0353074 A1* | 12/2015 | Kinoshita | B60K 6/445 701/22 |
| 2015/0367749 A1* | 12/2015 | Yaguchi | B60L 15/06 701/22 |
| 2016/0137184 A1* | 5/2016 | Hokoi | B60W 50/0097 701/22 |
| 2016/0152227 A1* | 6/2016 | Tabata | B60K 6/442 701/22 |

FOREIGN PATENT DOCUMENTS

| | | |
|---|---|---|
| DE | 102010029443 | 12/2011 |
| DE | 102011080758 | 2/2013 |
| EP | 2692604 | 2/2014 |

OTHER PUBLICATIONS

Search Report dated Nov. 18, 2016 which issued in the corresponding European Patent Application No. 16001156.5.
A. Wilde, A modular functional architecture for adaptive and predictive energy management in hybrid vehicles, dissertation, TU München, 2009.
J. von Grundherr, Derivation of a heuristic operating strategy for a hybrid vehicle from online optimization, dissertation, TU München, 2010.
Onori et al., Adaptive Equivalent Consumption Minimization Strategy for Hybrid Electric Vehicles, Proceedings of the ASME 2010, Dynamic Systems and Control Conference DSCC2010 Sep. 12-15, 2010, Cambridge (MA), USA.

* cited by examiner

METHOD FOR ONLINE ADAPTATION OF A CHARACTERISTIC OF A HYBRID VEHICLE

BACKGROUND OF THE INVENTION

1. Field of the Invention

The invention concerns a method for the online adaptation of a characteristic of a hybrid vehicle used to select an operating mode and/or to determine an operating point of the drive train.

2. Description of the Related Art

Steadily rising fuel costs as well as stricter legal regulations regarding vehicle emissions place ever higher requirements on the efficiency of motor vehicles. A great potential for reducing fuel consumption is represented by hybridization of the drive train. In doing this, the drive train is extended by at least one electrical machine and an associated electrical storage system.

Depending on the implementation of the hybridization, besides a purely combustion engine operation there can thus be further different operating modes, such as electric drive, boost mode, brake recovery, load point shifting, etc. An operating mode is characterized by the combination of a specific component configuration and the form of the energy that flows in the participating components of a drive train.

The different operating modes of a hybridized drive train must be used purposefully during the operation of the vehicle to achieve the maximum possible reduction of fuel consumption. During this, further aims or target criteria shall also be observed, because the increase in the fuel efficiency always takes place in the area of conflict between emission minimization, component protection, and/or ride comfort. It is therefore necessary to select, within the context of a higher level operating strategy, an optimal operating mode regarding the predetermined target criteria, with a corresponding optimal power distribution in the drive train, from a predetermined number of possible operating modes of the hybridized drive train for the current operating point in time.

Different techniques and methods are known from the prior art for the selection of a respective optimal operating mode within the context of an operating strategy. By way of example, reference is made for this to the following publications from the prior art:

[1]: A. Wilde, A modular functional architecture for adaptive and predictive energy management in hybrid vehicles, dissertation, TU München, 2009; and

[2]: J. von Grundherr, Derivation of a heuristic operating strategy for a hybrid vehicle from online optimization, dissertation, TU München, 2010; and

[3]: Onori et al., Adaptive Equivalent Consumption Minimization Strategy for Hybrid Electric Vehicles, Proceedings of the ASME 2010, Dynamic Systems and Control Conference DSCC2010 Sep. 12-15, 2010, Cambridge (Mass.), USA.

For example, methods based on so-called online optimizations are known that consider the vehicle to be a multidimensional optimizing problem that is described by a target function that not only includes physical variables such as the consumption, but also other requirements such as the noise emissions or the lifetime protection of components, etc. Thus for example, an overall cost function is proposed in the publication [2], by which, besides the target criterion "fuel efficiency", further target criteria such as for example the driveability (ride comfort) are taken into account. During this, target cost functions corresponding to the individual target criteria are combined to form an overall cost function by a summation, and then the decision regarding the operating strategy is calculated from the overall cost function.

For each predetermined target criteria, at least one assessment variable for the quantitative description of the respective target criterion is established or determined in advance. For the calculation of the assessment variables and for modelling the cost functions, as a rule, a plurality of characteristics is used.

Above all, with many target criteria that have to take into account by an operating strategy, the application of an operating mode selection method is complex due to the many characteristics with numerous dependencies.

Further, the application of an operating strategy is, as a rule, only carried out for a single planned use of the vehicle. In most cases however, deviations occur between the planned and the actual use of the vehicle. It would therefore be desirable to recognize said deviations during the operation of the vehicle and to adapt the operating strategy accordingly. Using such deviation data, the characteristics of the operating strategy could be adapted online, i.e. could be dynamically adapted while the vehicle is in driving mode, which with a rising dependency of the characteristics on each other is correspondingly difficult to achieve and/or requires high computing complexity. Further, in the operating strategy predictive information can be processed to respond to altered boundary conditions that precondition the energy storage arrangement for future events, and thus ensure the maximum target achievement. This too requires the online adaptation of the characteristics.

SUMMARY OF THE INVENTION

It is thus an object of one aspect of the invention to provide an improved method for the online adaptation of a characteristic of a hybrid vehicle, wherein the characteristic is used for the selection of an operating mode and/or for determining an operating point of the drive train, with which the disadvantages of conventional techniques can be avoided. One object of the invention is in particular to provide a simplified method for the online adaptation of a characteristic of a hybrid vehicle that is characterized by lower complexity and with which a number of characteristics can be adapted online with comparatively low computing complexity, in particular owing to altered boundary conditions or based on predictive information.

According to a first aspect of the invention, a method is provided for the online adaptation of at least one characteristic of a hybrid vehicle comprising a hybridized drive train with an electric drive that can be supplied with electricity from an electrical energy storage arrangement. The at least one characteristic is used here for the selection of an operating mode and/or for determining an operating point of the hybridized drive train.

The term "online adaptation" is understood to mean an adaptation of the characteristic during the operation or driving mode of the hybrid vehicle, so that for example the profile of the characteristic in the driving mode can be adapted to altered boundary conditions or with respect to predictive route information.

According to the method, a plurality of partition boundaries are established, by which a range of states of charge of the energy storage arrangement can be divided into a plurality of regions, wherein at least one of the partition boundaries can be variably determined during the operation of the vehicle.

The range of states of charge of the energy storage arrangement comprises as a rule a state of charge SOC of 0% to 100%. A state of charge boundary can be established by a state of charge value, for example by a SOC value of x %. With a variably specifiable partition boundary, the state of charge value x % can be altered while the vehicle is in driving mode, so that the position of the partition boundary changes, i.e. is shifted along the state of charge axis to the left or right.

According to the method, the profile of the at least one characteristic is predetermined de-pending on a state of charge of the energy storage arrangement, wherein the values of the at least one characteristic are fixedly predetermined at the partition boundaries. In other words, the ordinates of the characteristic are established at the positions of the partition boundaries regardless of the current state of charge value (abscissa) at which the partition boundaries are currently set. The predetermined profile of a characteristic is thus formed by a plurality of sub profiles, each extending from one partition boundary to a partition boundary adjacent thereto, wherein the ordinates of the boundary points of the sub profiles, which always lie on the partition boundaries, are fixed. Each sub profile is thus determined by the boundary points thereof and the function or curve shape of the respective sub profile for connecting the boundary points. With a variable partition boundary, the position of the boundary point lying on the partition boundary in the abscissa direction (i.e. the state of charge axis) is thus dependent on the current position of the partition boundary. For example, the curve shape of a sub profile can be determined as linear, parabolic, hyperbolic, etc.

Expressed mathematically, the function that associates a characteristic value with a state of charge value is thus predetermined, with the boundary conditions, so that the characteristic always comprises the predetermined fixed values at the partition boundaries. As a result, de-pending on the current values of the partition boundaries, a set of possible sub profiles and hence a set of possible characteristic profiles are predetermined, wherein by determining the values for the partition boundaries the profile of the characteristic is also uniquely determined.

As in the individual case, the characteristic profile is predetermined taking into account the above remarks, it is of course dependent on the technical reference material that forms the characteristic, and is not the subject matter of the present invention.

According to the method, an online adaptation of the at least one characteristic is performed in the case of a shift of at least one of the variable partition boundaries. During this, the at least one characteristic is shifted and scaled taking into account the fixedly predetermined values that the characteristic comprises at the partition boundaries and according to shifted variable partition boundary(ies), so that the characteristic is adapted to the shifted partition boundary(ies). In the case of a shift of a partition boundary, the characteristic thus "travels" with the partition boundary, wherein the profile of the characteristic between two partition boundaries is automatically scaled. Expressed mathematically, the characteristic profile is thus re-calculated based on the predetermined mathematical function for the characteristic profile, taking into account the new boundary conditions in the form of the boundary points that are shifted with the partition boundary(ies) of the characteristic.

The present invention makes use of the fact that each hybrid operating mode uses the electrical machine and therefore results in either charging or discharging of the energy storage arrangement. Thus the state of charge (SOC) of the energy storage arrangement can be used as a central variable for the application of operating strategies. According to one aspect of the invention, said state of charge of the energy storage arrangement is used to provide a structure for division of the state of charge of the energy storage arrangement by establishing the partition boundaries, using which characteristics of an operating strategy can be oriented and in which the characteristics of the method can be entered. The characteristic must however have a logical relationship to the state of charge of the electrical energy storage arrangement, i.e. it must be established depending on the state of charge, which is the case for the majority of characteristics that are typically used for the selection of an operating mode or of an operating point of a hybridized drive train. The partition boundaries defined by the state of charge (SOC) and the state of charge ranges formed as a result are an aid with which the characteristics of an operating strategy can be matched to each other. Each characteristic must be oriented to the boundaries such that the desired effects of the regions are ensured. As a result, all characteristics of the method comprise a common framework to which they can be adapted. The division of the SOC regions according to the invention is thus a simple option for dynamically adapting the characteristics in the driving mode. In addition, one or a plurality of the partition boundaries is/are shifted. The dynamic online adaptation of the characteristics is carried out by adapting the characteristics to the shifted partition boundaries. The same migrate with said boundaries and are automatically scaled accordingly. As a result, the complexity reduces in the case of dependencies between the characteristics.

It has already been mentioned that the predetermined profile of a characteristic can be formed by a plurality of sub profiles, each of which extends from a partition boundary to a partition boundary adjacent thereto. According to a preferred embodiment of the method, an adapted profile of the characteristic would result in the case of the shifting of at least one of the variable partition boundaries by extending, shortening and/or shifting in the abscissa direction of those sub profiles that end at least one partition boundary that has been shifted. Here a boundary point of a sub profile remains unchanged by the extension, compression and/or shifting in the abscissa direction of the characteristic, if it lies on a non-shifted partition boundary. On the other hand, a boundary point of a sub profile is shifted in the abscissa direction, i.e. in the direction of the state of charge axis, together with the partition boundary, if it lies on a shifted partition boundary. The ordinates (Y values) of the boundary points lying on the partition boundaries are fixedly predetermined, as has already been mentioned.

If for example two adjacent partition boundaries are shifted by the same amount to the left or by the same amount to the right along the state of charge axis, the adapted sub profile of the characteristic results that is located between said two partition boundaries, owing to a corresponding shift of the sub profile to the left or to the right—without extension or compression. If the separation of two adjacent partition boundaries reduces, the sub profile of the characteristic extending between them is compressed in the abscissa direction, i.e. in the x direction or in the direction of the state of charge axis. If the separation of two adjacent partition boundaries increases, the sub profile of the characteristic extending between them is extended in the abscissa direction. The extension factor or compression factor for the scaling of the sub profile results from the ratio of the separation of adjacent partition boundaries before and after the shift of the partition boundaries and can be different for each sub profile.

The overall profile of the adapted characteristic is thus formed from the resulting sub profiles, wherein sub profiles located between two partition boundaries, both of which have not been shifted, are not (do not have to be) adapted.

A further exemplary embodiment is characterized in that at least one of the partition boundaries is continuously adapted during the operation of the vehicle depending on information characterising a segment of the route ahead. For example, at least one of the partition boundaries can be continuously adapted during the operation of the vehicle depending on topo-graphical data of a segment of the route ahead indicating a decline profile and an incline pro-file or an altitude profile of the segment of route ahead. This enables for example the saving of electrical energy or early emptying of the storage arrangement for future events to be shown, if it is detected using the topographical data of a segment of the route ahead that the vehicle is moving towards a long incline or downslope.

A further advantageous option of the implementation according to the invention provides that at least one of the partition boundaries is continuously adapted during the operation of the vehicle depending on a parameter indicating a deviation from a planned use of the vehicle to an actual use of the vehicle. The partition boundaries can thus be adapted if a planned use of the vehicle, for which the application of the characteristic has been carried out, deviates from the actual use of the vehicle. For example, the lower boundaries and/or upper boundaries of the state of charge that are optimal for the service life, cf. the following description for this, can be adapted over the state of health of the battery, which in turn depends on the use of the vehicle. If for example the actual use of the vehicle results in an actual state of health of the battery that is less than the expected state of health, the lower boundary of the state of charge that is optimal for the service life is shifted closer to the lower state of charge boundary (0% boundary of the state of charge) and the upper boundary of the state of charge that is optimal for the service life is shifted closer to the upper state of charge boundary (100% boundary) of the state of charge. If by contrast the actual use of the vehicle results in an actual state of health of the battery that is greater than the expected state of health, the lower boundary of the state of charge that is optimal for the service life is shifted so as to be further from the 0% boundary of the state of charge, and the upper boundary of the state of charge that is optimal for the service life is shifted so as to be further from the 100% boundary of the state of charge.

An adaptation of the partition boundaries can however also be triggered by other predictive variables, such as a probable energy recovery during future braking that is calculated from the current speed of the vehicle. For example, a probable energy recovery during a future braking process of the hybrid vehicle can be determined during the operation of the hybrid vehicle depending on a current speed of the vehicle and at least one of the partition boundaries can be adapted during the operation of the vehicle depending on the deter-mined energy recovery. For example, a variably established charging boundary that specifies a state of charge of the energy storage arrangement, wherein if the same is exceeded no operating modes are selected in which the energy storage arrangement is charged further by consuming fuel, can be reduced, i.e. shifted further towards the 0% boundary of the state of charge, if the probable energy recovery exceeds a predetermined first threshold value, and can be increased if the probable energy recovery is less than a predetermined second threshold value.

Within the scope of the invention, the at least one characteristic can comprise a characteristic that specifies an upper boundary for the fuel mass throughput as a function of the state of charge of the energy storage arrangement. The characteristic thus specifies a desired maxi-mum fuel mass throughput. With said characteristic, the use of the internal combustion engine can be prioritized depending on the current state of charge of the energy storage arrangement. For example, at higher states of charge, operating points or operating modes that a result in a smaller fuel mass throughput should be preferentially selected.

The nominal performance of the electrical energy storage arrangement as a function of the state of charge of the energy storage arrangement is represented by a further exemplary characteristic. With the characteristic, the use of the electrical machine can be prioritized depending on the current state of charge of the energy storage arrangement. For example, at higher states of charge operating points or operating modes that result in a high battery (dis-charge) power should be preferentially selected.

A known partition boundary of the energy storage arrangement can be the lower state of charge boundary (0% SOC boundary), which characterizes a state of charge of the energy storage arrangement from which the energy storage arrangement is outwardly completely discharged. A further known partition boundary of the energy storage arrangement can be the upper state of charge boundary (100% SOC boundary), which characterizes a state of charge of the energy storage arrangement from which the energy storage arrangement is outwardly fully charged. Said two partition boundaries are preferably not variable.

Exemplary embodiments for partition boundaries of the energy storage arrangement, which are advantageously variably determined during the operation of the vehicle depending on operating parameters or can be variably determined online, are described below:

A partition boundary can be a lower boundary of the state of charge of the energy storage arrangement that is optimal for the service life, that characterizes a state of charge boundary below which the state of charge is not to fall for service life reasons and that is selected so that the energy storage arrangement can be safely operated over a nominal service life of the energy storage arrangement if the state of charge does not fall below said state of charge boundary.

A partition boundary can be an upper boundary of the state of charge of the energy storage arrangement that is optimal for the service life, that characterizes a state of charge boundary that is not to be exceeded for service life reasons and that is selected so that the energy storage arrangement can be safely operated over a nominal service life of the energy storage arrangement if said state of charge boundary is not exceeded.

Establishing an upper boundary and a lower boundary of the state of charge that are optimal for service life enables the implementation of operating strategies to protect the energy storage arrangement against premature ageing by overcharging protection and excessive discharge protection. Among other things, the current state of health (SOH) of the electrical energy storage arrangement and the previous energy throughput since commissioning of the energy storage arrangement can be incorporated in the calculation of said boundaries.

According to one aspect of the invention, a method is provided for the selection of an operating mode of a hybridized drive train and/or for determining an operating point of the hybridized drive train of a hybrid vehicle. The method comprises a method for the online adaptation of at least one characteristic of the hybrid vehicle for this, as described in this document.

An advantageous embodiment version of the method provides that the plurality of partition boundaries comprise a discharge boundary that can be determined variably during the operation of the vehicle depending on operating parameters and that specifies a state of charge of the energy storage arrangement, wherein if the state of charge falls below the boundary, according to the method for the selection of an operating mode only operating modes are selected that do not discharge the energy storage arrangement. Examples of such operating modes are a solely internal combustion engine mode or a load point increase, with which the internal combustion engine provides both the power to fully meet the positive driver input torque and also for simultaneous charging of the traction energy storage arrangement.

A further advantageous embodiment version of the method provides that the plurality of partition boundaries comprises a discharge boundary that can be variably determined during the operation of the vehicle depending on operating parameters and that specifies a state of charge of the energy storage arrangement, in the event of exceeding which no operating modes are selected in which the energy storage arrangement is charged further by consuming fuel.

According to a further aspect of the invention, a device is provided that is arranged to perform a method for the online adaptation of at least one characteristic of a hybrid vehicle, as dis-closed in this document, or a method for the selection of an operating mode of a hybridized drive train and/or for determining an operating point of the hybridized drive train, as disclosed in this document. The invention further concerns a motor vehicle, in particular a commercial vehicle, with such a device.

In summary, with the invention a method for the online adaptation of at least one characteristic of a hybrid vehicle is provided, with which the state of charge of the energy storage arrangement is identified as a central variable of an operating strategy and a fixed starting point for the development of the further parameters of an operating strategy. The division of the entire state of charge into different regions produces a common structure for all characteristics of the operating strategy and is therefore an aid to the application of the characteristics. The ability to adapt the characteristics to a common structure reduces the complexity owing to the structuring of the dependencies and produces consistent logic among the different characteristics. The application of the operating strategy is simplified as a result. The structure thus provides a simple option to undertake online adaption of the characteristics based on altered boundary conditions or predictive information.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The preferred embodiments and features of the invention described above can be combined with each other in any way. Further details and advantages of the invention are described below with reference to the accompanying figures. In the figures.

DETAILED DESCRIPTION OF THE PRESENTLY PREFERRED EMBODIMENTS

Figure 1:
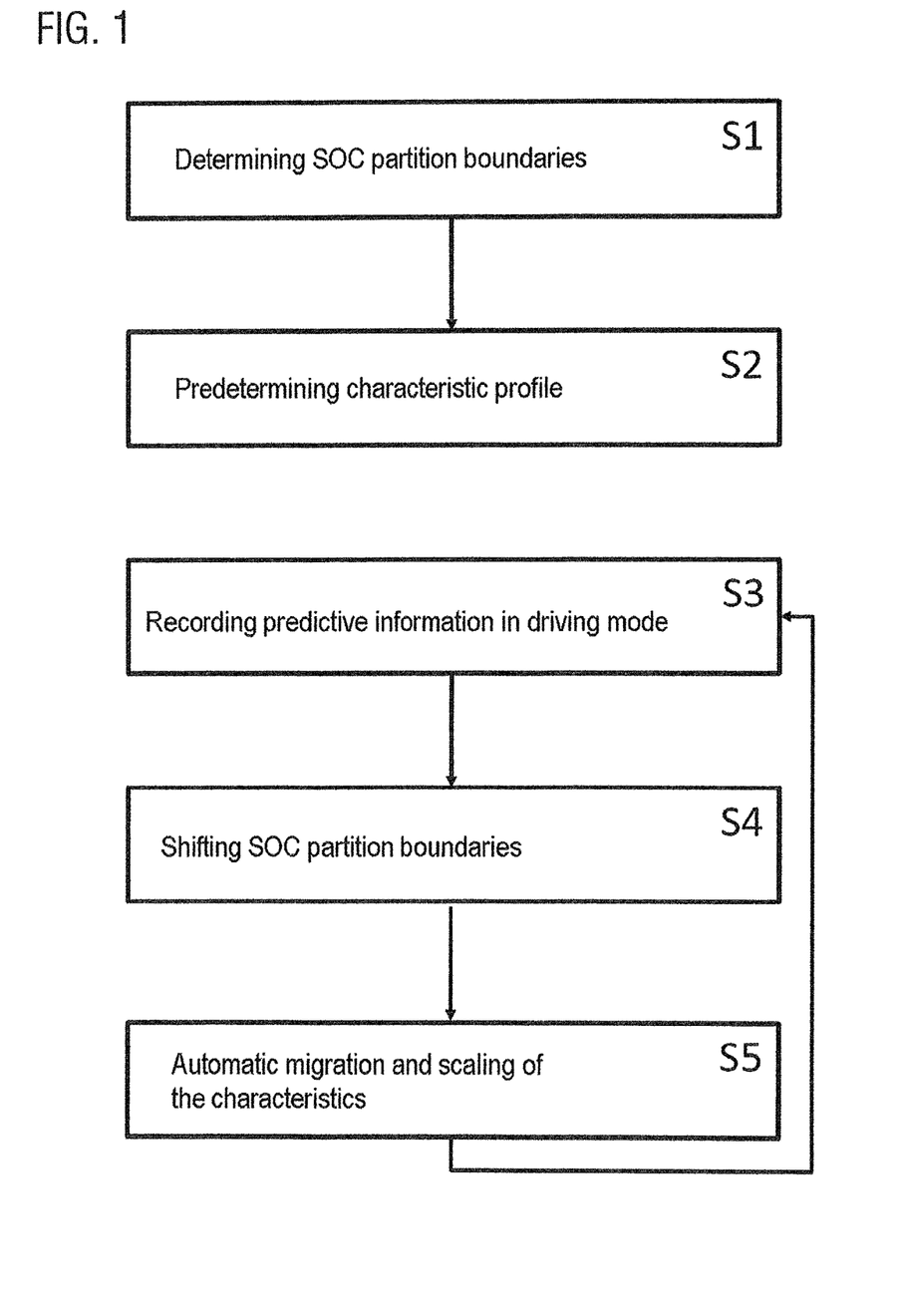
FIG. 1 is a flow chart for Illustration of the steps of a method for the online adaptation of a characteristic.

FIG. 1 shows an exemplary flow chart for illustrating the steps of a method for the online adaptation of a characteristic according to an embodiment of the invention.

The method concerns a hybrid vehicle, which thus comprises a hybridized drive train, with an internal combustion engine and an electric drive, wherein the electrical drive can be supplied with electricity from an energy storage arrangement for electrical energy (electrical energy storage arrangement).

Steps S1 and S2 are carried out "offline", i.e. not in the driving mode of the vehicle, but al-ready before or during the programmatic installation of the vehicle controller that is designed to perform the online method.

Figure 2:
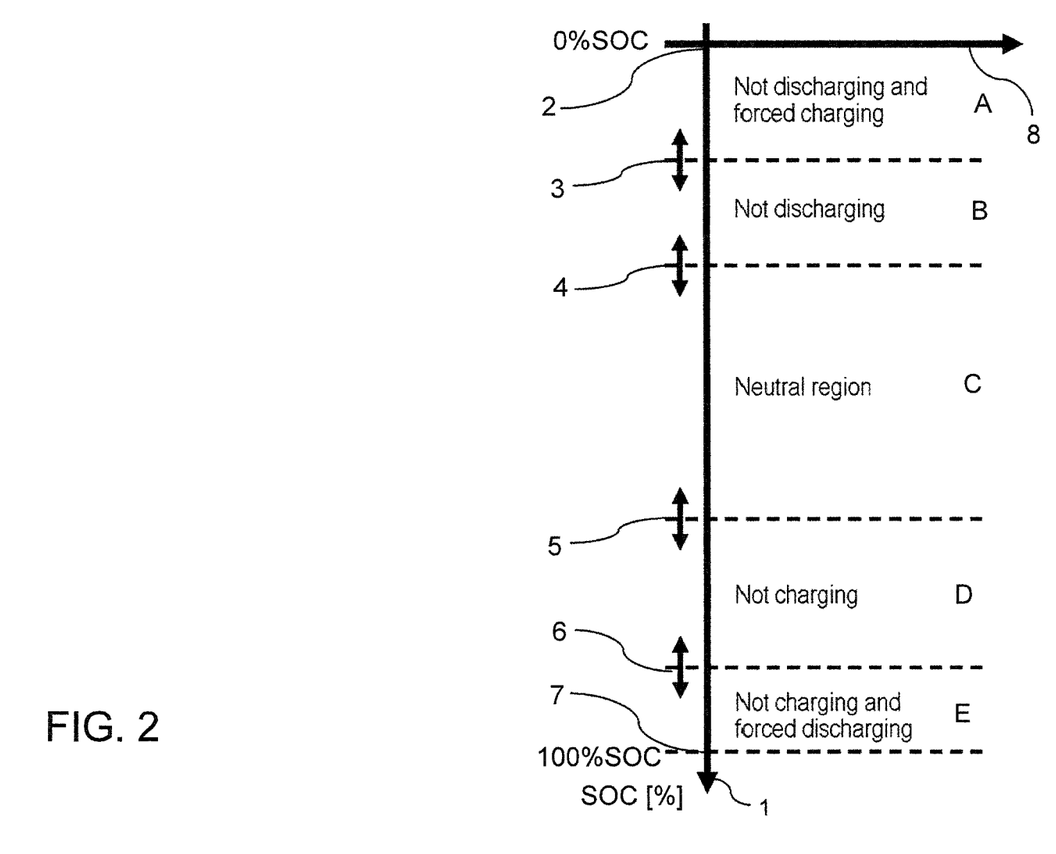
FIG. 2 is an exemplary division of the range of the state of charge of the energy storage arrangement into a plurality of regions.

In step S1, a plurality of partition boundaries, also referred to in abbreviated form below as boundaries, for dividing a range of states of charge (SOC range) of the electrical energy storage arrangement, are established. This is represented in FIG. 2 schematically and by way of example. Identical or functionally equivalent elements are denoted in all figures with the same reference characters.

The abscissa axis indicates the state of charge axis (SOC axis) 1. The range of states of charge extends from 0% to 100%.

As can be seen in FIG. 2, a plurality of partition boundaries 2 to 7 are established for dividing the range of states of charge of the energy storage arrangement into the regions A to E. The region A extends between the boundaries 2 and 3, the region B between the boundaries 3 and 4 etc. The boundaries 2 and 7 are not variable. The boundary 2 is the lowest state of charge boundary, which identifies a state of charge of the energy storage arrangement from which the energy storage arrangement is fully discharged, i.e. the state of charge (SOC) is 0%. The boundary 7 by contrast is the upper state of charge boundary, which identifies a state of charge of the energy storage arrangement from which the energy storage arrangement is outwardly fully charged, i.e. the state of charge (SOC) is 100%.

On the other hand, the boundaries 3 to 6 can be variably determined during the operation of the vehicle, i.e., the boundaries 3 to 6 can be shifted along the state of charge axis 1 to the left or right, which is represented schematically by the black double arrows. The adaptation of the boundaries in the driving mode is yet to be described below.

The boundary 3 constitutes a lower boundary that is optimal for the service life. The boundary 3 identifies a state of charge of the electrical energy storage arrangement that is not to be exceeded for service life reasons. The boundary is selected so that the energy storage arrangement can be safely operated over the planned service life thereof when taking said limitation into account. Among other things, for example the current state of health (SoH) and the previous energy throughput are incorporated in the calculation of said boundary.

The boundary 4 constitutes a discharge boundary. The boundary 4 describes a state of charge below which no operating modes may be selected by the operating strategy that discharge the energy storage arrangement. Further discharging is thus not possible owing to the operating strategy, but father discharging of the electrical energy storage arrangement is conceivable owing to secondary electrical loads, for example.

The boundary 5 constitutes a charging boundary. The boundary 5 describes a state of charge, above which the energy storage arrangement is not to be charged further by consuming fuel. Exceeding said boundary is thus only possible if the energy is produced in a different way, for example by the brake recovery mode.

The boundary 6 constitutes an upper boundary that is optimal for the service life. The boundary 6 identifies a state of charge that is not to be exceeded for service life reasons. The boundary is selected so that the energy storage arrangement can be safely operated over the planned service life thereof when taking said limitation into account. Among other things, for example the current state of health and the previous energy throughput can be incorporated into the calculation of said boundary.

With the boundaries mentioned by way of example, different operating regions A to E can be defined over the entire state of charge range:

Within the region A, no discharging operating mode may be selected by the operating strategy. At the same time, where possible the storage arrangement must be forcibly charged. No discharging operating mode may be selected by the operating strategy within the region B. At the same time, the option is provided such that the operating strategy decides against charging by consuming fuel. The region C constitutes the neutral region. In said region, both operating modes that discharge the energy storage arrangement and also operating modes that charge the energy storage arrangement can be selected. Within the region D, no operating mode that charges the storage arrangement while consuming fuel may be selected by the operating strategy. At the same time, the option is provided such that the operating strategy decides against a discharging operating mode. Within the region E, no charging operating mode may be selected by the operating strategy. At the same time, where possible the storage arrangement must be forcibly discharged.

Depending on which region A to E the state of charge is currently located, the operating strategy thus has different operating modes and/or operating points available for selection, which is described in detail below using FIGS. 3 and 4.

The boundaries 2 to 7 and regions A to E defined by means of the range of states of charge constitute an aid with which the characteristics of an operating strategy can be adapted to one another. Each characteristic must be oriented to the boundaries so that the desired effects of the regions are ensured. As a result, all characteristics of the method have a common framework to which they can be adapted. As a result, the complexity is reduced in the case of dependencies between the characteristics.

As shown in FIG. 1, after establishing the partition boundaries the characteristic profiles are established depending on the state of charge of the energy storage arrangement.

Figure 3:
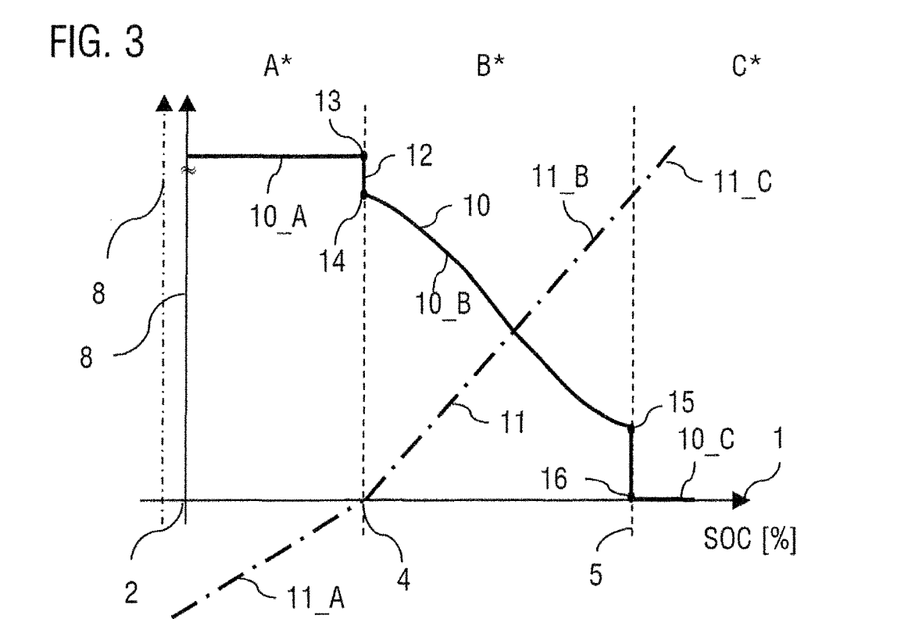
FIG. 3 is an exemplary profile of two characteristics.
Figure 4:
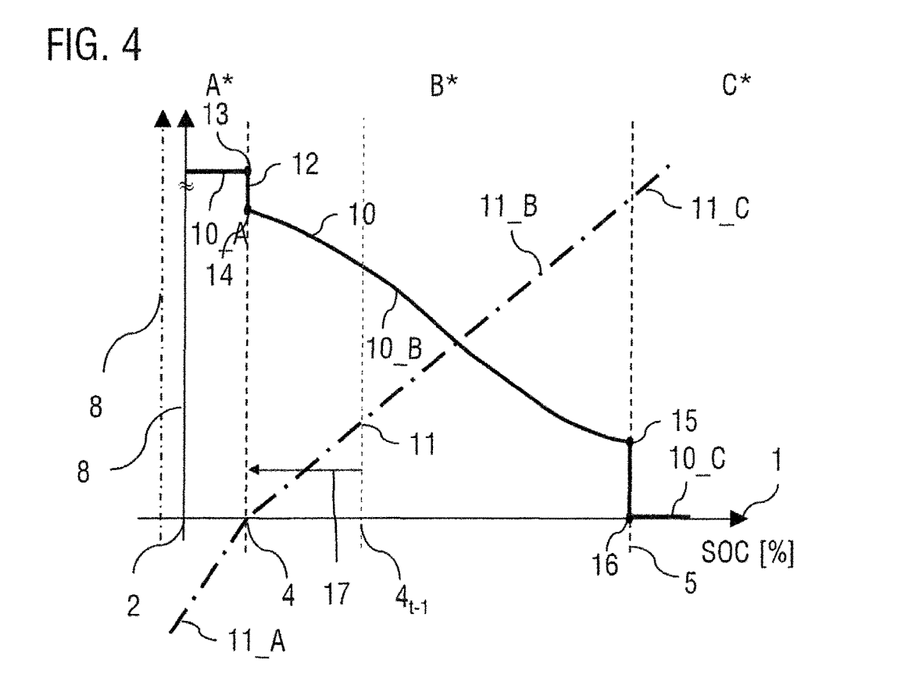
FIG. 4 is the adapted profile of the characteristics from FIG. 3 following a shift of a partition boundary.

This is illustrated in FIG. 3 by way of example for two characteristics. In contrast to the ex-ample of FIG. 2, the range of states of charge in FIG. 3 does not comprise the partition boundary 3. The displaceable partition boundary 4 corresponds to the discharge boundary described above. Thus the resulting regions A*, B*, C* of the state of charge range also do not correspond to the regions of FIG. 2 and are therefore marked with a "*". To simplify the representation, only a section of the range of states of charge is illustrated in FIG. 3.

A first characteristic, the profile of which is represented by the solid line 10, indicates the de-sired maximum fuel mass throughput (right Y axis 8). The predetermined profile 10 of the characteristic is composed of the sub profiles 10_A, 10_B and 10_C, each of which extends from a partition boundary to a partition boundary that is adjacent thereto. The sub profile 10_A extends from the lower state of charge boundary 2 to the discharge boundary 4 of the state of charge. The sub profile 10_B extends from the discharge boundary 4 to the charging boundary 5, etc.

At higher states of charge, operating modes that result in a small fuel mass throughput should be preferentially selected. Consequently, the sub profile 10B comprises a negative gradient. At the upper partition boundary 5, there is a step to zero. Below the discharge boundary 4, the boundaries on the fuel mass throughput should be fully opened out in order to not limit the fuel mass throughput. At the point 14 the characteristic profile (segment 12 of the characteristic) jumps to infinity or a high value that practically does not limit the fuel mass throughput (profile 10_A).

A second characteristic, the profile of which is represented by the dashed-dotted line 11, indicates the target battery power of the energy storage arrangement (left Y axis 8). At higher states of charge, operating points that result in a high battery (discharge) power should be preferentially selected, therefore the characteristic rises. Below the discharge boundary 4, the storage arrangement should be charged rather than discharged, so that there is a negative target battery power in the region A*.

The profile of the characteristic is fixedly predetermined at the partition boundaries 4,5, i.e. the ordinates of those characteristic points 13, 14, 15, 16, the abscissa of which, i.e. the position on the state of charge axis, coincides with the position of a partition boundary 4,5, are fixedly predetermined. As a result, characteristic values are fixedly predetermined at the points of the partition boundaries, regardless of the current position of a variably determined partition boundary. In other words, the points 13 to 16 can indeed be shifted in the abscissa direction 1 if the partition boundary is shifted, but the ordinate thereof, i.e. the value on the axis 8, always remains the same.

The steps S3 to S5 are performed continuously in the driving mode of the hybrid vehicle.

In the driving mode of the vehicle, the partition boundaries can now be shifted, whereby the characteristics are automatically adapted.

For this purpose, in step S3 predictive information is continuously recorded in the driving mode. For example, the altitude profile of the segment of route ahead of the vehicle is continuously determined by analyzing topographical data.

In step S4, depending on the determined altitude profile a check is made as to whether a shift of the partition boundaries should be performed. If in doing so for example it is determined that the vehicle is approaching a long downslope, in which a long recovery phase is possible, the discharge boundary 4 is shifted to the left and set to a lower state of charge value. This is illustrated in FIG. 4. The new current discharge boundary 4 has been shifted to the left by the amount corresponding to the length of the arrow 17. The old discharge boundary is denoted in FIG. 4 by 4*t*-1.

In step S5, the profile of the characteristic is then automatically adapted. The characteristic points 13 and 14 lying on the shifted discharge boundary migrate with the discharge boundary 4 and are shifted to the left by the same amount. As a result, the profiles 10A and 11A of the characteristics are accordingly compressed in the abscissa direction 1. At the same time, the profiles 10B and 10C of the characteristic are accordingly extended in the abscissa direction 1. The profiles 10C and 11C are unchanged.

The dynamic online adaptation of the characteristics thus takes place by adaptation of the characteristics to the shifted partition boundaries. The characteristics migrate with said boundaries and are automatically scaled accordingly. The partition boundaries defined by means of the state of charge (SOC) and the state of charge ranges formed as a result constitute a reference framework with which the characteristics of an operating strategy can be adapted to one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Figure 5:
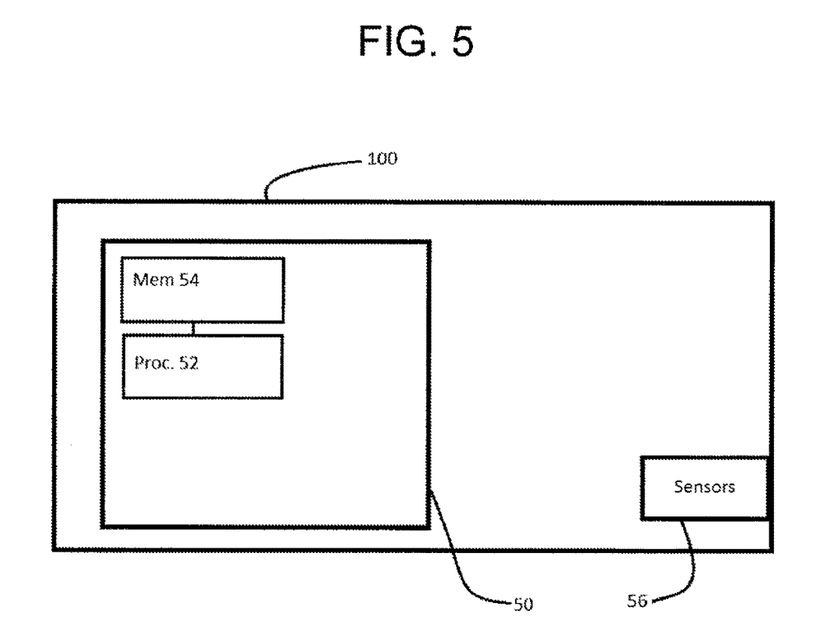
FIG. 5 is a device for online adaptation of a characteristic.

FIG. 5 is a device 50 arranged in a vehicle 100. The device 50 is configured to provide an improved method for the online adaptation of a characteristic of a hybrid vehicle, wherein the characteristic is used for the selection of an operating mode and/or for determining an operating point of the drive train, with which the disadvantages of conventional techniques can be avoided. The object of the invention is in particular to provide a simplified method for the online adaptation of a characteristic of a hybrid vehicle that is characterized by lower complexity and with which a number of characteristics can be adapted online with comparatively low computing complexity, in particular owing to altered boundary conditions or based on predictive information.

The device 50 comprises at least a microprocessor 52 and a memory 54. The microprocessor is configured to establish a plurality of partition boundaries 2 to 7 that divide a range of states of charge 1 of the electrical energy storage arrangement into a plurality of regions A to E, wherein at least one of the partition boundaries 3 to 6 is configured to be variably deter-mined S1 during the operation of the vehicle. The memory 54 is configured to store a predetermined profile 10, 11 of the at least one characteristic based at least in part on a state of charge of the electrical energy storage arrangement, wherein respective values 13 to 16 of the at least one characteristic at the plurality of partition boundaries 2 to 7 are fixedly predetermined S2. The microprocessor 54 is further configured to perform online adaptation of the at least one characteristic in a case of a shift of the at least one variable partition boundary 3 to 6, wherein the at least one characteristic is shifted and scaled S4, S5 based at least in part on the fixedly predetermined values 13 to 16 at the partition boundaries 2 to 7 and corresponding to the shifted variable partition boundary 3 to 6.

During the operation of the hybrid vehicle a probable energy recovery during a future braking process of the hybrid vehicle is determined as a function of a current speed of the vehicle and at least one of the partition boundaries is adapted during the operation of the vehicle based at least in part on the determined energy recovery based on input from one or more sensors 56.

Although the invention has been described with reference to certain exemplary embodiments, it is apparent to a person skilled in the art that different changes can be carried out and equivalents can be used as replacements without departing from the scope of the invention. In addition, many modifications can be made without departing from the associated scope. Consequently, the invention should not be limited to the disclosed exemplary embodiments, but should comprise all exemplary embodiments that fall within the scope of the accompanying claims. In particular, the invention also claims protection for the subject matter and the features of the dependent claims independently of the referenced claims.

What is claimed is:

1. A method for the online adaptation of multiple characteristics of a hybrid vehicle having a hybridized drive train with an electric drive configured to be supplied with electricity from an electrical energy storage arrangement, comprising:
   (a) establishing a plurality of partition boundaries that divide a range of states of charge of the electrical energy storage arrangement into a plurality of regions, wherein at least one of the partition boundaries is configured to be variably determined during an operation of the vehicle; and
   (b) predetermining a profile of the multiple characteristics based at least in part on a state of charge of the electrical energy storage arrangement, wherein respective values of the multiple characteristics at the plurality of partition boundaries are fixedly predetermined, wherein the ordinates of the characteristics are established at the positions of the partition boundaries regardless of the current state of charge value at which the partition boundaries are currently set; and
   (c) online adaptation of the multiple characteristics in a case of a shift of the at least one variable partition boundary, wherein the multiple characteristics is shifted and scaled based at least in part on the fixedly predetermined values at the partition boundaries and corresponding to the shifted variable partition boundary,
      wherein the multiple characteristics are used for selection of at least one of an operating mode of the drive train and for determining an operating point of the drive train and at least one of an operating the drive train in the selected operating mode and operating the drive train at the determined operating point,
      wherein the predetermined profile of each of the multiple characteristics is formed by a plurality of sub-profiles, each sub-profile extending from a respective partition boundary to an adjacent partition boundary,
      wherein an adapted profile of the multiple characteristics results when there is a shift of at least one of the variable partition boundaries by one or more of an extension, a compression, and a shift in an abscissa direction of the characteristic of those sub-profiles that end at at least one partition boundary that has been shifted, and wherein a boundary point of a sub-profile remains unchanged during the one or more of the extension, the compression, and the shift in the abscissa direction if the boundary point lies on a non-shifted partition boundary or is shifted in the abscissa direction together with the partition boundary when the boundary point lies on a shifted partition boundary.

2. The method according to claim 1, wherein one or more of
   (a) at least one of the partition boundaries is continuously adapted during vehicle operation based at least in part on information characterizing a segment of route ahead; and
   (b) at least one of the partition boundaries is continuously adapted during the vehicle operation based at least in part on topographical data of a segment of route ahead indicating a decline profile and an incline profile of the segment of route ahead.

3. The method according to claim 1, wherein the multiple characteristics comprises a characteristic that one of
   (a) specifies an upper boundary for a fuel mass throughput based at least in part on the state of charge of the electrical energy storage arrangement; and
   (b) specifies a nominal performance of the electrical energy storage arrangement based at least in part on the state of charge of the energy storage arrangement.

4. The method according to claim 1, wherein the plurality of partition boundaries includes:
   (a) a lower state of charge boundary that identifies a state of charge of the electrical energy storage arrangement from which the electrical energy storage arrangement is outwardly fully discharged; and
   b) an upper state of charge boundary that identifies a state of charge of the energy storage arrangement from which the electrical energy storage arrangement is outwardly full charged.

5. The method according to claim 1, wherein the plurality of partition boundaries includes at least one the following partition boundaries that is variably determined during the operation of the vehicle as a function of operating parameters:
   (a) a lower boundary of the state of charge of the energy storage arrangement that identifies a state of charge boundary below which the state of charge should not lie that is selected so that the electrical energy storage arrangement is safely operated over a nominal service life of the electrical energy storage arrangement when the state of charge does not fall below the state of charge boundary;
   (b) an upper boundary of the state of charge of the electrical energy storage arrangement that identifies a state of charge boundary that should not be exceeded that is selected so that the electrical energy storage arrangement is safely operated over a nominal service life of the energy storage arrangement when said state of charge boundary is not exceeded.

6. A method for the selection of an operating mode of a hybridized drive train and/or for determining an operating point of the hybridized drive train of a hybrid vehicle, comprising a method for the online adaptation of multiple characteristics of the hybrid vehicle comprising:
   (a) establishing a plurality of partition boundaries that divide a range of states of charge of the electrical energy storage arrangement into a plurality of regions, wherein at least one of the partition boundaries is configured to be variably determined during an operation of the vehicle; and
   (b) predetermining a profile of the multiple characteristics based at least in part on a state of charge of the electrical energy storage arrangement, wherein respective values of the multiple characteristics at the plurality of partition boundaries are fixedly predetermined, wherein the ordinates of the characteristics are established at the positions of the partition boundaries regardless of the current state of charge value at which the partition boundaries are currently set; and
   (c) online adaptation of the multiple characteristics in a case of a shift of the at least one variable partition boundary, wherein the multiple characteristics is shifted and scaled based at least in part on the fixedly predetermined values at the partition boundaries and corresponding to the shifted variable partition boundary, wherein the multiple characteristics are used for the selection of at least one of an operating mode of the drive train and for determining an operating point of the drive train and at least one of an operating the drive train in the selected operating mode and operating the drive train at the determined operating point, wherein the predetermined profile of each of the multiple characteristics is formed by a plurality of sub-profiles, each sub-profile extending from a respective partition boundary to an adjacent partition boundary, wherein an adapted profile of the multiple characteristics results when there is a shift of at least one of the variable partition boundaries by one or more of an extension, a compression, and a shift in an abscissa direction of the characteristic of those sub-profiles that end at at least one partition boundary that has been shifted, and wherein a boundary point of a sub-profile remains unchanged during the one or more of the extension, the compression, and the shift in the abscissa direction if the boundary point lies on a non-shifted partition boundary or is shifted in the abscissa direction together with the partition boundary when the boundary point lies on a shifted partition boundary.

7. The method according to claim 6, wherein the plurality of partition boundaries includes at least one of the following partition boundaries that is variably determined during the operation of the vehicle as a function of operating parameters:
   (a) a discharge boundary that indicates a state of charge of the energy storage arrangement below which only operating modes are selected in which the electrical energy storage arrangement is not discharged; and
   (b) a charging boundary that indicates a state of charge of the energy storage arrangement, above which no operating modes are selected in which the energy storage arrangement is charged further by consuming fuel.

8. The method according to claim 1, wherein, at least one of
   (a) during the operation of the hybrid vehicle a probable energy recovery during a future braking process of the hybrid vehicle is determined as a function of a current speed of the vehicle and at least one of the partition boundaries is adapted during the operation of the vehicle based at least in part on the determined energy recovery.

9. A device comprising:
a microprocessor configured to establish a plurality of partition boundaries that divide a range of states of charge of the electrical energy storage arrangement into a plurality of regions, wherein at least one of the partition boundaries is configured to be variably determined during the operation of the vehicle; and
a memory configured to store a predetermined profile of the multiple characteristics based at least in part on a state of charge of the electrical energy storage arrangement, wherein respective values of the multiple characteristics at the plurality of partition boundaries are fixedly predetermined, wherein the ordinates of the characteristics are established at the positions of the partition boundaries regardless of the current state of charge value at which the partition boundaries are currently set,
wherein the microprocessor is further configured to perform online adaptation of the multiple characteristics in a case of a shift of the at least one variable partition boundary, wherein the multiple characteristics is shifted and scaled based at least in part on the fixedly predetermined values at the partition boundaries and corresponding to the shifted variable partition boundary,
wherein the multiple characteristics is used for the selection of at least one of an operating mode of the drive train and for determining an operating point of the drive train and at least one of an operating the drive train in the selected operating mode and operating the drive train at the determined operating point,
wherein the predetermined profile of each of the multiple characteristics is formed by a plurality of sub-profiles, each sub-profile extending from a respective partition boundary to an adjacent partition boundary,
wherein an adapted profile of the multiple characteristics results when there is a shift of at least one of the variable partition boundaries by one or more of an extension, a compression, and a shift in an abscissa direction of the characteristic of those sub-profiles that end at at least one partition boundary that has been shifted, and
wherein a boundary point of a sub-profile remains unchanged during the one or more of the extension, the compression, and the shift in the abscissa direction if the boundary point lies on a non-shifted partition boundary or is shifted in the abscissa direction together with the partition boundary when the boundary point lies on a shifted partition boundary.

10. A motor vehicle with a device according to claim 9.

11. The method according to claim 1, wherein one or more of
(a) at least one of the partition boundaries is continuously adapted during a vehicle operation based at least in part on information characterizing a segment of a route ahead; and
(b) at least one of the partition boundaries is continuously adapted during the vehicle operation based at least in part on a topographical data of a segment of the route ahead indicating a decline profile and an incline profile of the segment of the route ahead.

12. The method according to claim 6, wherein, at least one of
(a) during the operation of the hybrid vehicle a probable energy recovery during a future braking process of the hybrid vehicle is determined as a function of a current speed of the vehicle and at least one of the partition boundaries is adapted during the operation of the vehicle based at least in part on the determined energy recovery.

13. The method according to claim 1, wherein the plurality of regions comprise at least:
a forced charging region,
a forced discharging region and
a neutral region in which a charging and discharging mode are available,
wherein at least one of the partition boundaries of the neutral region is configured to be variably determined during an operation of the vehicle.

* * * * *